(12) United States Patent
Osumi et al.

(10) Patent No.: US 7,561,301 B2
(45) Date of Patent: Jul. 14, 2009

(54) SYSTEM AND METHOD FOR IMAGE PATTERN PRINTING ON OBJECTS

(75) Inventors: Hisayoshi Osumi, Shuchi-gun (JP); Takashi Watanabe, Hamamatsu (JP); Toshiyuki Yamamura, Hamamatsu (JP); Satoshi Mine, Hamamatsu (JP); Kaoru Nakajima, Hamana-gun (JP); Naohisa Mori, Hamakita (JP)

(73) Assignee: Yamaha Corporation, Shizuoka (JP)

( * ) Notice: Subject to any disclaimer, the term of this patent is extended or adjusted under 35 U.S.C. 154(b) by 709 days.

(21) Appl. No.: 11/017,200

(22) Filed: Dec. 21, 2004

(65) Prior Publication Data

US 2005/0168502 A1    Aug. 4, 2005

(30) Foreign Application Priority Data

Dec. 22, 2003 (JP) ............................. 2003-423945
Dec. 22, 2003 (JP) ............................. 2003-423967
Mar. 19, 2004 (JP) ............................. 2004-080942

(51) Int. Cl.
    *G06F 15/00* (2006.01)
(52) U.S. Cl. ........................... 358/1.9; 358/1.1; 358/1.2
(58) Field of Classification Search .................. 358/1.9, 358/1.1, 1.2; 347/1
    See application file for complete search history.

(56) References Cited

U.S. PATENT DOCUMENTS

| | | | | |
|---|---|---|---|---|
| 5,282,306 | A * | 2/1994 | Katsuhiro et al. | 29/469.5 |
| 5,831,641 | A * | 11/1998 | Carlson | 347/2 |
| 6,360,656 | B2 * | 3/2002 | Kubo et al. | 101/35 |
| 6,460,958 | B2 * | 10/2002 | Kubo et al. | 347/2 |
| 7,048,651 | B2 * | 5/2006 | Kennedy et al. | 473/378 |

FOREIGN PATENT DOCUMENTS

| | | |
|---|---|---|
| JP | 61-267763 | 11/1986 |
| JP | 2-156243 | 6/1990 |
| JP | 5-293955 | 11/1993 |
| JP | 6-246977 | 9/1994 |
| JP | 7-115557 | 5/1995 |
| JP | 10-157202 | 6/1998 |
| JP | 2000-190462 A | 7/2000 |
| JP | 2001-191514 | 7/2001 |
| JP | 2001-328254 | 11/2001 |
| JP | 2003-38065 | 2/2003 |
| JP | 2003-200697 | 7/2003 |
| JP | 2003-274142 | 9/2003 |

\* cited by examiner

*Primary Examiner*—Kimberly A Williams
(74) *Attorney, Agent, or Firm*—William L. Androlia; H. Henry Koda

(57) ABSTRACT

A printing system is designed to reduce the overall time and the cost required for printing patterns on objects such as musical instruments and prevents printed patterns from being partially extended or distorted. Image data representing prescribed patterns are processed in response to object form data representing the form of an object, wherein upon receipt of a user's print instruction, an RGB color inkjet printer ejects ink onto a prescribed surface of the object on the basis of the processed image data. Image data can be produced by picking up an image of another surface of the object, which is transferred onto the prescribed surface of the object, thus establishing a sense of unity in visual sensation therebetween. Alternatively, image data can be processed in correspondence with the selected surface of the object, so that the prescribed image is printed on the selected surface of the object.

8 Claims, 9 Drawing Sheets

FIG. 3
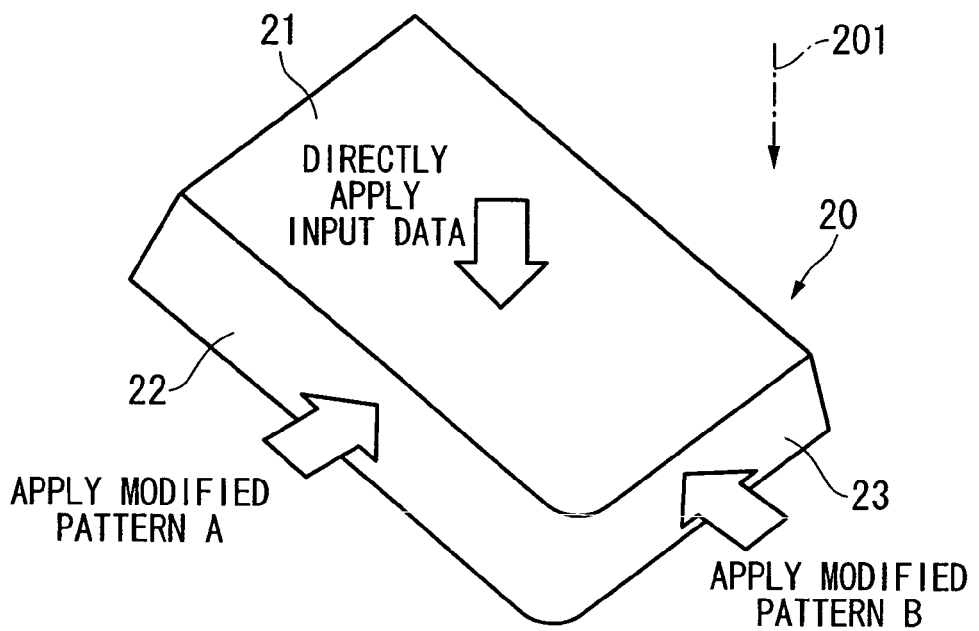
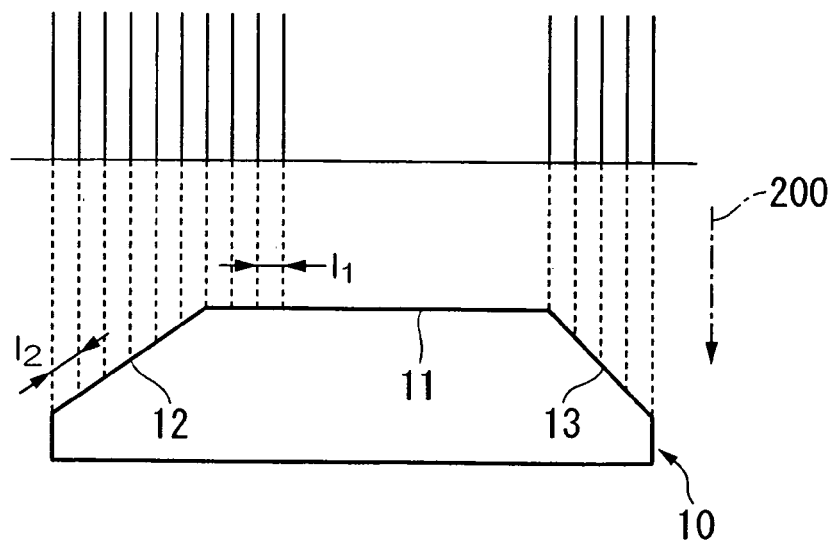
FIG. 4A
FIG. 4B

FIG. 7A
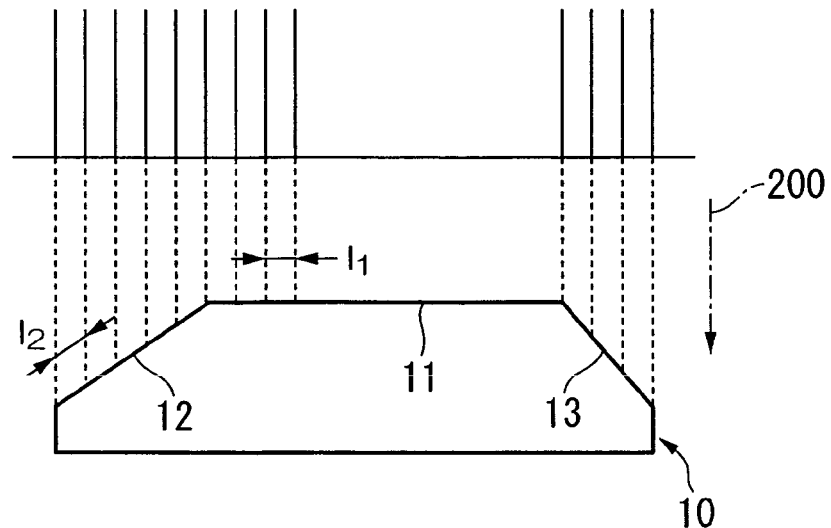
FIG. 7B
FIG. 7C
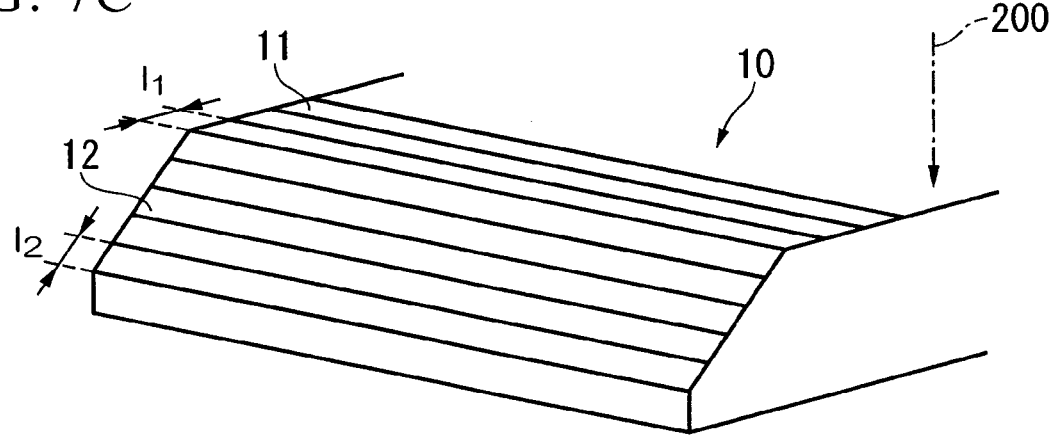

PATTERN PRINTING AREA

PICK UP IMAGE OF PATTERN OF OBJECT

SYSTEM AND METHOD FOR IMAGE PATTERN PRINTING ON OBJECTS

BACKGROUND OF THE INVENTION

1. Field of the Invention

This invention relates to systems and methods for printing images and patterns on objects, members, and commodities such as musical instruments and furniture.

This application claims priority on Japanese Patent Applications Nos. 2003-423967, 2003-423945, and 2004-80942, the contents of which are incorporated herein by reference.

2. Description of the Related Art

Conventionally, prescribed patterns are printed on members such as wooden arms (or side bars) of keyboard instruments having complicated shapes by one of, or by combination of, the following methods (1) to (5).

(1) Pattern printing by hot stamping.
(2) Vacuum adhesion of decorative sheets (or laminated sheets) having patterns such as vinyl chloride sheets and olefin sheets.
(3) Combination of polyester laminated sheets having patterns and DAP sheets.
(4) Direct printing by photogravure coaters.
(5) Direct printing by inkjet printers.

Japanese Patent Application Publication No. 2000-190462 discloses a printing method using an inkjet printer and watercolor ink for printing images on surfaces of wooden members with a high degree of fixation and high durability. Herein, an inkjet printer is used to directly transfer ink on surfaces of thick wooden members.

However, the aforementioned methods (1) to (5) suffer from the following problems.

(a) In the method (2), when multicolor printing such as photogravure printing is performed on a single sheet composed of vinyl chloride, olefin, and polyethylene terephthalate (PET), it is necessary to produce an expensive master (e.g., engraving and samplers), whereby printing is subjected to color correction and then actually performed on prescribed objects. For this reason, it takes a very long lead time (e.g., several months) and is very expensive (e.g., several millions of yen per master).

(b) In the methods (1) and (2) in which sheets are adhered onto prescribed objects, the degree of freedom in three-dimensional shaping and designing of objects should be reduced due to the restriction of adhesion.

(c) The method (3) does not provide a sense of unity with regard to patterns printed on objects.

(d) In the methods (1), (2), (4), and (5), when patterns are printed on objects having curved surfaces, patterns printed on curved surfaces may be partially extended and distorted, so that the decorative value may be degraded.

(e) The method (4), in which direct printing is performed using the photogravure coater, makes it possible to perform single-color printing or two-color printing only; hence, it is difficult to realize printing using various and colorful patterns. In addition, it is difficult to precisely reproduce colors even in simple patterns, that is, it is difficult to reproduce patterns with fidelity to original images.

(f) In the methods (1) and (2), when printing is performed on objects having three-dimensionally curved surfaces, it is difficult to adhere sheets onto three-dimensionally curved surfaces of objects. In this case, even when sheets are attached to three-dimensionally curved surfaces of objects, patterns may be distorted so as to give unnatural appearances.

Hereinafter, the aforementioned problem (d) in which patterns are partially extended and distorted will be described in detail.

With reference to FIGS. 7A to 7C, the phenomenon in which a printed pattern, which is printed on a prescribed object by using an inkjet printer, is partially extended and distorted will be described. FIG. 7A is a plan view showing a striped pattern of image data in which stripes are formed with equal distance therebetween. FIG. 7B is a cross-sectional view of an object 10 that is subjected to printing. FIG. 7C is a perspective view of the member 10 on which the pattern is actually printed. Herein, reference symbol $I_1$ denotes the distance between stripes printed on a first surface 11 that is flat, and reference symbol $I_2$ denotes the distance between stripes printed on a second surface 12 that is slanted, wherein $I_1 < I_2$. Reference numeral 200 denotes an axis lying in an ink ejecting direction by the inkjet printer.

The reference axis 200 lying in the ink ejecting direction of the inkjet printer is drawn in parallel with the normal axis lying in the normal direction of the first surface 11, while it is not drawn in parallel with the normal axis lying in the normal direction of the second surface 12 and the normal axis lying in the normal direction of a third surface 13. When the pattern in which stripes are formed with equal distance therebetween is printed on the object 10, the distance between the adjacent stripes is precisely maintained on the first surface 11, while the pattern should be partially extended and distorted on the second surface 12 and the third surface 13 due to their shapes.

SUMMARY OF THE INVENTION

It is an object of the invention to provide a printing system and a printing method, which can reduce the overall time required for printing patterns on objects and the total cost required for realizing printing.

It is another object of the invention to provide a printing system and a printing method, which can prevent patterns printed on objects from being partially extended and distorted.

It is a further object of the invention to provide a printing system and a printing method, which can realize a sense of unity in visual sensation between various patterns printed on an object.

In a first aspect of the invention, a printing system comprises a data processing device for processing image data based on object form data representing a form of an object, and a printer for injecting ink onto a prescribed surface of the object on the basis of the processed image data. Alternatively, a printing method includes a first step of processing image data based on object form data, and a second step of injecting ink onto a prescribed surface of the object on the basis of the processed image data.

In the above, the image data are processed based on the object form data when a normal axis lying in a normal direction of the prescribed surface of the object does not lie in parallel with a reference axis lying in an ink injecting direction in which the ink is injected onto the prescribed surface of the object.

That is, a prescribed pattern is printed on the prescribed surface of the object based on the image data, which are produced using a scanner, a digital camera, and the like. This eliminates the time and cost required for producing a master whose pattern is to be picked up to produce digital image data. Hence, it is possible to perform pattern printing on any type of objects with a relatively low cost and in a short period of time. In addition, the image data are adequately processed in consideration of the form of the object even when the object has curved surfaces, which are curved two-dimensionally or three-dimensionally, so that pattern printing can be precisely performed based on the processed image data. This prevents printed patterns from being partially extended or distorted even when the object has curved surfaces.

In a second aspect of the invention, image data are produced with respect to a pattern of a first surface of an object and are then processed based on object form data representing the form of the object, so that the pattern is transferred to a second surface of the object on the basis of the processed image data.

In the above, image data are produced with respect to the 'existing' pattern of the first surface of the object, which is then transferred to the second surface of the object. Herein, it is possible to realize a sense of unity in visual sensation between the existing pattern of the object and the newly printed pattern of the object, which are formed and printed at different areas of the object.

In a third aspect of the invention, image data are processed in response to object form data representing the form of an object, wherein upon selection of a certain surface of the object, a printer is activated to print a prescribed pattern on the selected surface of the object based on the processed image data, and wherein the selected surface of the object is controlled to be directed towards an ink ejecting portion of a printer. This allows the prescribed pattern to be printed on the selected surface of the object that is accurately directed towards the ink ejecting portion of the printer.

BRIEF DESCRIPTION OF THE DRAWINGS

These and other objects, aspects, and embodiments of the present invention will be described in more detail with reference to the following drawings, in which:

FIG. 3 is a perspective view showing an object, which is subjected to printing;

FIG. 4A is a plan view showing a striped pattern of image data;

FIG. 4B is a cross-sectional view of an object that is subjected to printing;

FIG. 7A is a plan view showing a striped pattern of image data;

FIG. 7B is a cross-sectional view of an object that is subjected to printing;

FIG. 7C is a perspective view of the object on which the striped pattern is actually printed;

DESCRIPTION OF THE PREFERRED EMBODIMENTS

This invention will be described in further detail by way of examples with reference to the accompanying drawings.

1. First Embodiment

Figure 1:
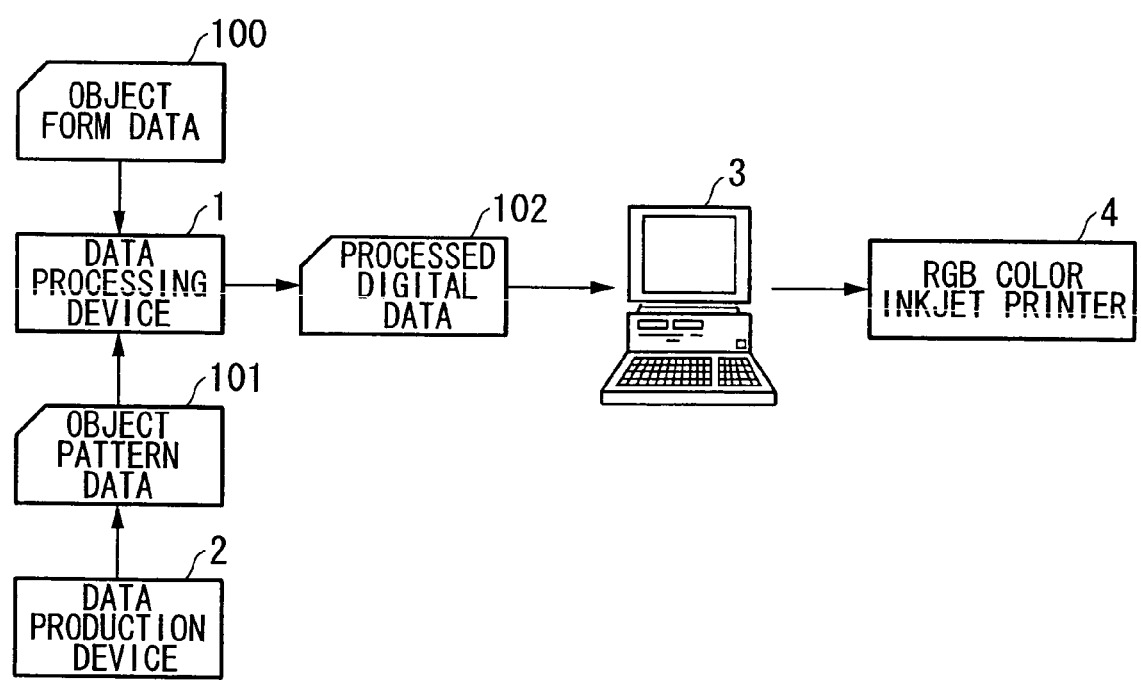
FIG. 1 is a block diagram showing the overall constitution of a printing system in accordance with a first embodiment of the invention.

FIG. 1 is a block diagram showing the overall constitution of a printing system in accordance with a first embodiment of the invention, wherein reference numeral 1 designates a data processing device for processing image data. The data processing device 1 is equipped with a display and an operation unit (neither of which is shown), by which image data are subjected to processing in accordance with user's instructions. The data processing device 1 is capable of performing various image processing such as rotation, magnification, reduction, and inversion on image data. Reference numeral 2 designates a data production device that inputs images regarding various objects, which are image samples, so as to produce object pattern data 101. The data production device 2 can be realized using a scanner and a digital camera, which can pick up images in prescribed digital formats. Alternatively, it is possible to download so-called copyright-free images, which are publically available, via the Internet. The object pattern data 101 are transferred from the data production device 2 to the data processing device 1 via a cable and the like.

The data processing device 1 processes the object pattern data 101. Specifically, the data processing device 1 inputs object form data 100 representing shapes and forms of objects, which are subjected to printing, so that it performs image processing on the object pattern data 101 based on the object form data 100. The object form data 100 represent shapes and forms of objects, which are designed using the software implementing the computer aided design (i.e., CAD). Of course, it is possible to produce the object form data 100 by performing three-dimensional scanning or measurement of objects.

The data processing device 1 processes the object pattern data 101 so as to produce processed digital data 102. Reference numeral 3 designates a master controller that performs the overall control on printing. The master controller 3 can be realized using a general-purpose personal computer and the like. The processed digital data 102 are supplied to the master controller 3 via a prescribed network such as a local area network (LAN). Alternatively, the processed digital data 102 are supplied to the master controller 3 by use of digital storage media such as flexible disks, CD-ROMs, etc. The printing system of FIG. 1 can be modified such that the master controller 3 realizes the aforementioned function of the data processing device 1.

Upon receipt of user's instructions, the master controller 3 controls an RGB color inkjet printer 4 (where "RGB" represents three primary colors, i.e., red, green, and blue). In response to a user's print instruction, the master controller 3 supplies the processed digital data 102 to the RGB color inkjet printer 4, which is designed to cope with large or thick materials such as wooden materials. Based on the processed digital data 102 output from the master controller 3, print heads (not shown) of the RGB color inkjet printer 4 eject ink onto prescribed surfaces of objects, on which prescribed patterns are being printed.

The RGB color inkjet printer 4 can be replaced with other printers which use thermal heads, wire dot heads, and the like as print heads. The aforementioned functions of the data processing device 1 and the master controller 3 can be realized using a general-purpose personal computer and the like.

Figure 2:
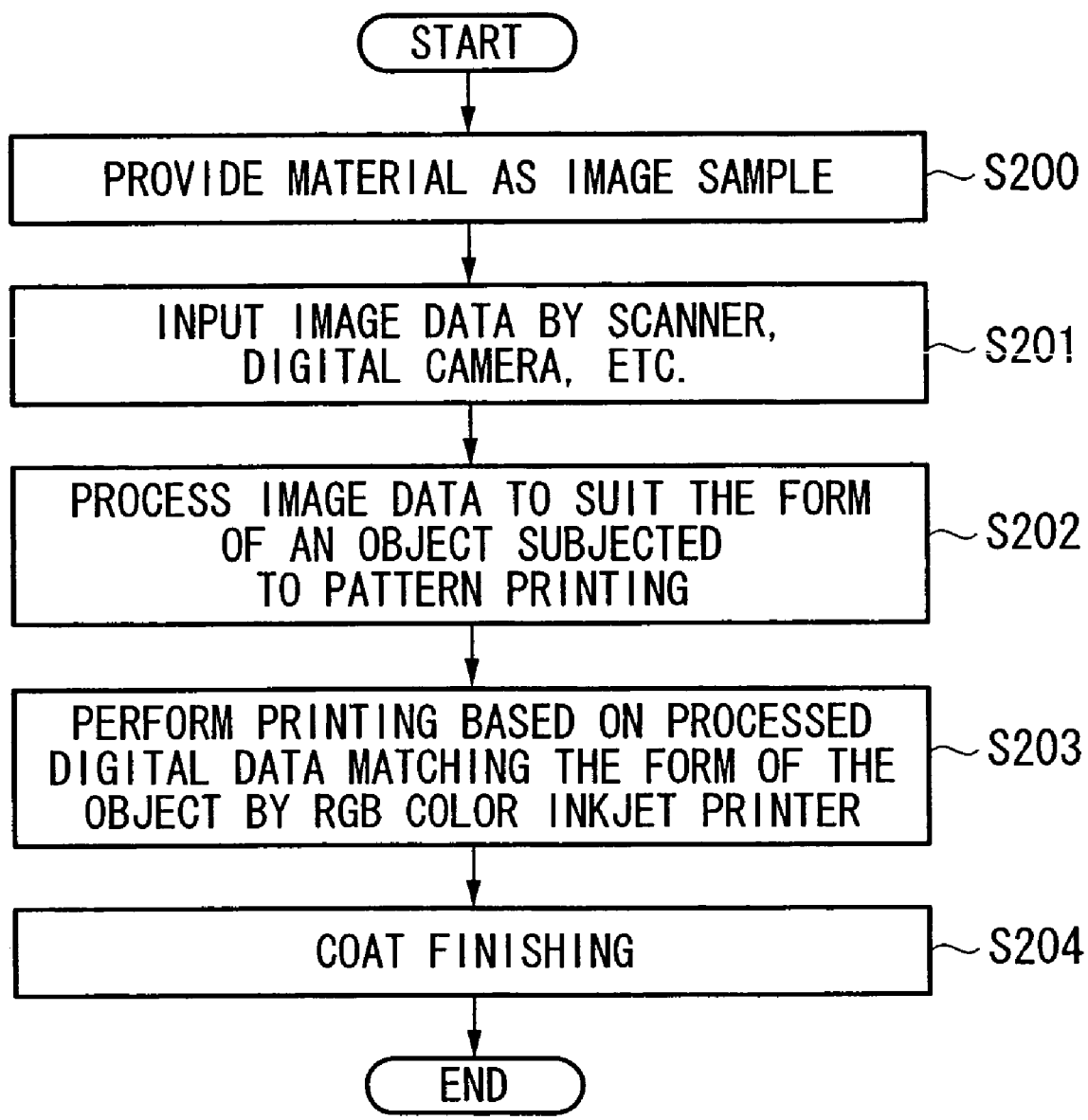
FIG. 2 is a flowchart showing printing procedures in the first embodiment of the invention.

Next, printing procedures of the present embodiment will be described with reference to FIG. 2. In step S200, a material such as an image sample is provided. Herein, it is possible to use various materials such as paint sample forms, pictures, drawings, and photographs. In step S201 the data production device 2 picks up the image of the material so as to produce image data. In step S202, the data processing device 1 inputs and processes the image data input to suit the form of the object, which is subjected to pattern printing. Herein, the data processing device 1 inputs the object form data 100 in advance, so that it processes the image data based on the form of the object represented by the object form data 100, thus producing the processed digital data 102. In addition, the data processing device 1 performs image processing such as rotation, magnification, reduction, aspect ratio modification (in which a certain aspect ratio between the horizontal and vertical scales is modified to realize enlargement and reduction), and inversion as well as color tone control, and brightness and shading control on images, thus producing the processed digital data 102.

As described above, in step S202, the image data are processed to match the form of the object so as to produce the processed digital data 102, which are supplied to the master controller 3. In step S203, upon receipt of a user's print instruction, the master controller 3 supplies the processed digital data 102 to the RGB color inkjet printer 4, which in turn prints a prescribed pattern on the prescribed surface of the object based on the processed digital data 102.

In step S204, coat finishing is performed on the object on which the prescribed pattern is printed by the RGB color inkjet printer 4. It is possible to perform various types of coat finishing such as specular gloss finishing and flat finishing. Of course, it is possible to omit the coat finishing.

Next, the image data processing of the data processing device 1 will be described in detail.

(a) First Processing

FIG. 3 shows various image data applications with respect to surfaces 21-23 of an object 20, wherein a reference axis 201 lies in the ink ejecting direction of the RGB color inkjet printer 4. When the normal axis lying in the normal direction of the first surface 21 lies in parallel with the reference axis 201, it is possible to directly apply image data, which are produced using a scanner or a digital camera, to the first surface 21.

Both of the normal axes lying in the normal directions of the other surfaces 22 and 23 do not lie in parallel with the reference axis 201; therefore, it is not possible to directly apply the image data produced by the scanner or digital camera to the surfaces 22 and 23. For this reason, the original image data are processed based on the object form data 100, so that the processed image data are applied to the second surface 22 and the third surface 23 respectively.

The details of the first processing will be described with reference to FIGS. 4A and 4B, which correspond to FIGS. 7A and 7B. FIG. 4A is a plan view showing a striped pattern of image data; and FIG. 4B is a cross-sectional view of the object 10 having the surfaces 11-13, which are subjected to pattern printing. Suppose that the normal axis lying in the normal direction of the first surface 11 lies in parallel with the reference axis 200 lying in the ink ejecting direction. In order to print the striped pattern on the object 10 in such a way that stripes are each printed with equal distance therebetween with respect to all the surfaces 11 to 13, it is necessary to process image data so as to establish the relationship of $I_1 = I_2$ with respect to the surfaces 12 and 13. That is, the pattern is modified in such a way that all stripes are printed on the surfaces 11, 12, and 13 with equal distance therebetween, so that the image data are processed to realize the modified pattern to be projected onto the virtual plane that is arranged in parallel with the first surface 11.

In the above, the data processing device 1 processes the image data with reference to the object form data 100 and in consideration of angles that are formed between the first surface 11 and the other surfaces 12 and 13 respectively. Even when the surface has a curved shape, the data processing device 1 can adequately process the image data in response to the curvature represented by the object form data 100.

(b) Second Processing

Figure 5A:
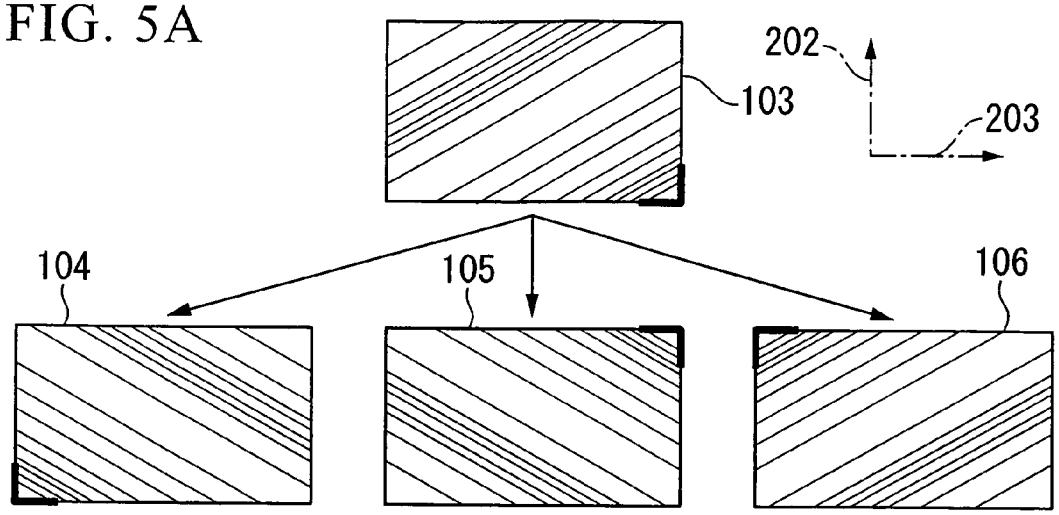
FIG. 5A shows a variety of image data, which are created by image processing.

The second processing will be described with reference to FIGS. 5A to 5C, wherein the data processing device 1 stores image data 103 representing an original image (see FIG. 5A) in advance. Upon receipt of a user's process instruction, the data processing device 1 performs left/right inversion on the image data 103 (which are thus symmetrically inverted with respect to a reference axis 202), thus producing image data 104. Similarly, the data processing device 1 performs up/down inversion on the image data 103 (which are thus symmetrically inverted with respect to a reference axis 203 perpendicular to the reference axis 202), thus producing image data 105. In addition, the data processing device 1 performs left/right inversion on the image data 105, or it performs up/down inversion on the image data 104, thus producing image data 106.

Figure 5B:
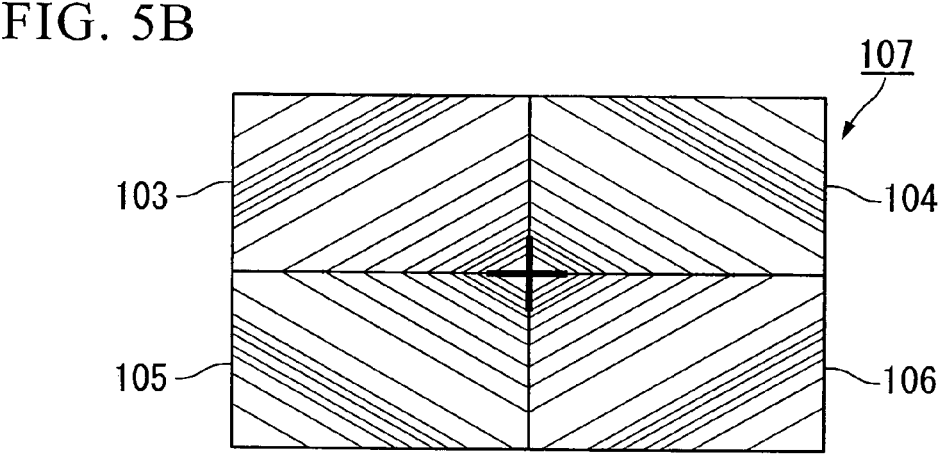
FIG. 5B shows a combined image corresponding to a combination of four groups of image data, shown in FIG. 5A.
Figure 5C:
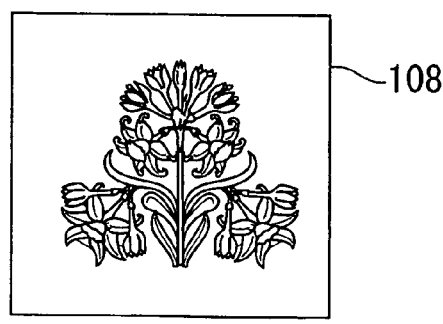
FIG. 5C shows a pictorial pattern that can be combined with the combined image shown in FIG. 5B.

Then, the data processing device 1 combines the image data 103 to 105 as shown in FIG. 5B in which prescribed corners 'X' are arranged adjacent to each other, thus producing image data 107. Incidentally, the data processing device 1 can perform other processing such as the magnification, reduction, and aspect ratio modification on the image data 103 to 107 respectively. In addition, the data processing device 1 can combine the image data 107 with other image data 108 representing a pictorial pattern shown in FIG. 5C, for example, so as to produce composite image data used for printing. Of course, it is possible to use the image data 107 for printing.

Next, working examples of the present embodiment will be described in detail. A first example is produced in accordance with the following steps.

(1) Data Source Production

A mahogany sliced sheet whose thickness is 0.5 mm is adhered to a laminated sheet whose thickness is 10.0 mm so as to produce a sampler, which is then subjected to wood finishing using 'P180' sandpaper; thereafter, the sampler is subjected to coloring using a urethane resin based coloring agent and is then subjected to drying at room temperature for sixteen hours. Subsequently, the sampler is coated with an unsaturated polyester resin clear coat so as to realize a thickness of 400 μm, wherein it is then subjected to drying for sixteen hours. Finally, the sampler is subjected to polishing using 'P800' sandpaper and is further subjected to polishing using a polishing buff. Thus, it is possible to complete production of the sampler.

(2) Image Pickup

A scanner is used to pick up an image of the sampler so as to produce digital image data representing coloring and patterns of the sampler.

(3) Data Processing

The digital data are subjected to processing so as to produce a variety of reduced image data, which allow patterns to be transferred to prescribed surfaces of a base material.

(4) Surface Treatment

The base material is prepared by cutting work on 'MDF' (i.e., a medium density fiber board) in accordance with prescribed CAD data, wherein in order to improve fixing of patterns, the prescribed surfaces of the base material are coated with a urethane resin so as to realize a coating density of 50 g/m$^2$ by use of a brush; thereafter, the base material is dried at 50° C. for one hour and is then polished using P180 sandpaper.

(5) Printing

A general-purpose RGB color inkjet printer is used to print patterns on the prescribed surfaces of the base material, thus producing an object having printed patterns. When the object has flat surfaces, it is possible to print patterns by a single printing operation. With respect to the object having curved surfaces in addition to flat surfaces, the printing is divided into plural operations by which patterns are printed on the flat surfaces and the curved surfaces respectively. In this case, the curved surfaces can be further divided into plural sections, each of which is independently subjected to printing by using 'optimal' image data selected therefor, wherein divided sections are determined such that patterns printed on different sections do not overlap each other in association with the aforementioned data processing (see step (3)).

(6) Finishing

The aforementioned object having printed patterns on the surfaces thereof is coated with a urethane resin coat so as to realize a coating thickness of 20 µm and is then dried for sixteen hours; thereafter, it is subjected to irregularity polishing using 'P240' sandpaper. In addition, the object is further coated with an unsaturated polyester resin coat so as to realize a coating thickness of 400 µm and is then dried at room temperature for sixteen hours. Lastly, the member is polished using 'P800' sandpaper and is then subjected to finishing using a buff.

Thus, it is possible to exactly reproduce mahogany wood patterns with fidelity in the aforementioned member having flat and curved surfaces, which exhibits a very beautiful appearance due to coat finishing. The total time required to completely perform the aforementioned steps, including the production of the sampler for providing the original image data, is only eight days, wherein the present embodiment does not require the cost for the production of a photogravure offset master, which is conventionally required. In addition, the present embodiment does not require other sheets and forms; hence, it does not waste materials for the production of other sheets and samplers. Furthermore, the present embodiment allows a single pattern to be independently selected for the production of a single object.

Meanwhile, when the aforementioned pattern printing is performed in accordance with the conventional method, four months are required for the production of an original master and for the adjustment of color tone in printing, and the production of a master requires 2.5 million yen, for example. In addition, the conventional method requires specific sheet materials for the production of a base material subjected to printing in units of 1000-meter lengths, each of which may be equivalent to the total line for the production of one hundred electronic keyboard instruments.

For a trial, a second object is produced by performing the aforementioned steps in pattern printing except for the step (4) regarding the urethane resin coating. The second object may lack clearness and sharpness in the appearance of printed patterns but can demonstrate appropriate exquisiteness in printing, wherein the second object has continuously changing patterns such as grained patterns and is finished naturally.

In addition, a third object is produced by performing the aforementioned steps except for the step (1) for producing the sampler having mahogany grain patterns, which is replaced with a vinyl chloride sheet having mahogany printed patterns that is used to produce digital image data. The third object has grain patterns, which are similar to those realized by the aforementioned steps (1) to (5) in appearance. In this case, it is possible to reduce the time required for the production of the sampler to three days, for example; hence, the third object can be produced in five days. That is, it is possible to further reduce the lead time. Incidentally, the data source corresponding to the digital image data can be created using artificial geometric patterns, naturally existing objects, and other printed materials.

Next, a second example will be described. Similar to the first example, the second example is produced basically in accordance with the aforementioned steps in pattern printing, whereas the step (1) for the production of the 'mahogany' sampler is omitted, while an Indian rose picture is used as "data source 1", and a wooden image is used as "data source 2", and wherein in the steps (2) and (3), the combination of a mahogany picture and a wooden image is used in data processing. An object is actually produced in accordance with the second example, and we find that the produced object have very beautiful appearance due to exquisite patterns in which the wooden image is applied to the Indian rose picture.

Figure 6A:
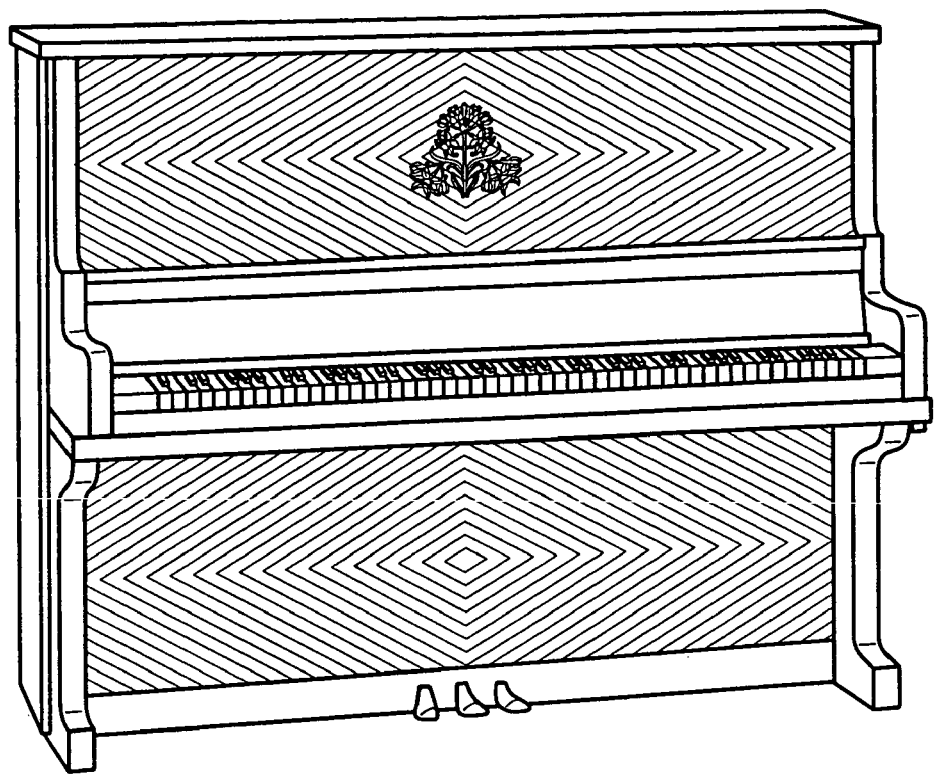
FIG. 6A is a perspective view showing the exterior appearance of a piano having printed patterns.
Figure 6B:
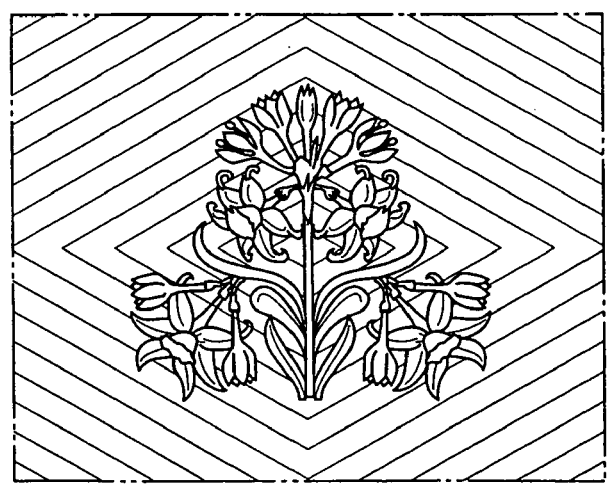
FIG. 6B is an enlarged view showing a printed pattern applied to the piano, which are produced based on the combination of plural image data.

FIGS. 6A and 6B show printed patterns applied to a piano, which are reproduced based on image data created in accordance with the second object, wherein FIG. 6A is a perspective view showing the exterior appearance of a piano having printed patterns, and FIG. 6B is an enlarged view showing a specific pattern that is produced based on the combination of plural image data. Incidentally, the second example in which image data are subjected to processing to realize pattern printing is not necessarily applied to the aforementioned object; that is, it can be applied to a variety of objects such as various musical instruments, furniture, and construction materials as well as keyboard instruments such as pianos and electronic pianos.

The second example can demonstrate pattern printing and produce objects in accordance with steps similar to those of the first example, whereas it can use various picture samples such as user's family pictures and other patterns according to the user's preference. In accordance with the second example, it is possible to produce a unique object in which a family picture is incorporated into a desired pattern according to the user's preference; hence, the user may use the object as an exterior decoration for an electronic piano, for example.

According to the present embodiment described above, various patterns can be adequately printed onto various objects based on digital image data. That is, the present embodiment merely requires digital image data, based on which various patterns are printed on various objects. In addition, the present embodiment does not need a specific sampler or master; hence, it is possible to perform pattern printing on various objects at a relatively low cost and in a short period of time. Therefore, the present embodiment effectively and promptly fulfills the user's demand without requiring the production cost of a specific sampler or master. Furthermore, single image data can be applied to a wide variety of objects.

The present embodiment allows digital image data to be processed in response to various forms of objects, so that patterns are printed on objects based on processed digital image data. That is, even when objects have curved surfaces, it is possible to prevent printed patterns from being partially extended and distorted; hence, it is possible to realize natural decorative effects in visual sensation.

Recently, designers are in environments allowing them to easily produce digital image data by using scanners and digital cameras and also allowing them to download digital image data into personal computers via the Internet, wherein when image processing devices are available, it is possible for them to confirm the exterior appearance of the completely finished products. Therefore, they can easily and rapidly present the finished images of the products to users.

Moreover, the pattern printing method of the present embodiment can precisely reproduce images of digital image data with high fidelity so as to print patterns on objects. Hence, it is possible to produce objects whose exterior appearances exhibit a sense of unity in visual sensation, whereby printed patterns are naturally unified with objects. It is possible to coat surfaces of objects, which are completed in pattern printing, with protective layers having protective functions, wherein it is possible to realize variations of textures such as gloss.

2. Second Embodiment

Next, a printing system according to a second embodiment will be described in detail, wherein the hardware configuration thereof is similar to that of the first embodiment shown in FIG. 1; hence, the detailed description thereof will be omitted.

Figure 8:
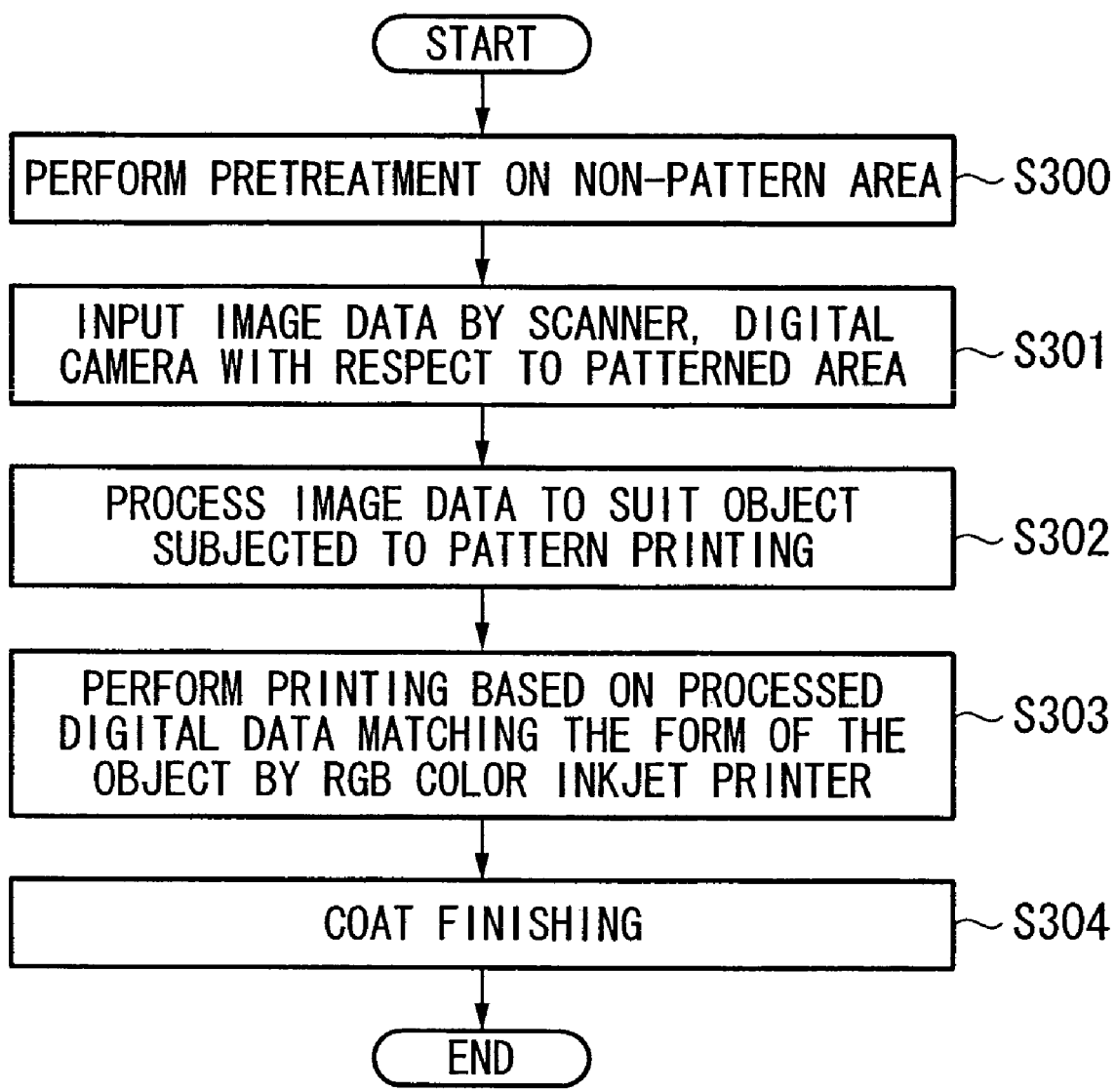
FIG. 8 is a flowchart showing printing procedures in a second embodiment of the invention.

With reference to FIG. 8, printing procedures according to the second embodiment will be described, wherein image data are produced with reference to a prescribed pattern printed on a pattern-printed area of an object, so that the RGB color inkjet printer 4 is used to print the prescribed pattern on a non-pattern area of the object based on the image data.

In step S300, pretreatment is performed on the non-pattern area of the object in order to prepare for printing.

In step S301, the data production device 2 picks up an image of a pattern on the object so as to produce image data. In step S302, the data processing device 1 processes the image data to suit the form of the object, wherein the data processing device 1 has the object form data 100 in advance so that the image data are processed based on the form of the object represented by the object form data 100, thus producing the processed digital data 102. Herein, the data processing device 1 performs various image processing such as rotation, magnification, reduction, aspect ratio modification, and inversion as well as color tone control, and brightness and shading control, thus producing the processed digital data 102.

In step S303, the master controller 3 inputs the processed digital data matching the form of the object, wherein upon receipt of a user's print instruction, it supplies the processed digital data 102 to the RGB color inkjet printer 4. Based on the processed digital data 102 supplied from the master controller 3, the RGB color inkjet printer 4 prints the prescribed pattern on the prescribed surface of the object.

In step S304, coat finishing is performed on the object which was subjected to pattern printing by the RGB color inkjet printer 4. Of course, it is possible to satisfactorily omit the coat finishing. Incidentally, it is possible to use specular gloss finishing and flat finishing as the coat finishing.

Next, working examples of the present embodiment will be described in detail.

A first example is produced in accordance with the following steps with reference to FIGS. 9A to 9D.

(1) Polyester laminated sheets are prepared in advance by printing grain patterns on MDF (i.e., medium density fiber board) and are adhered to both surfaces of an object by use of adhesive.

Figure 9A:
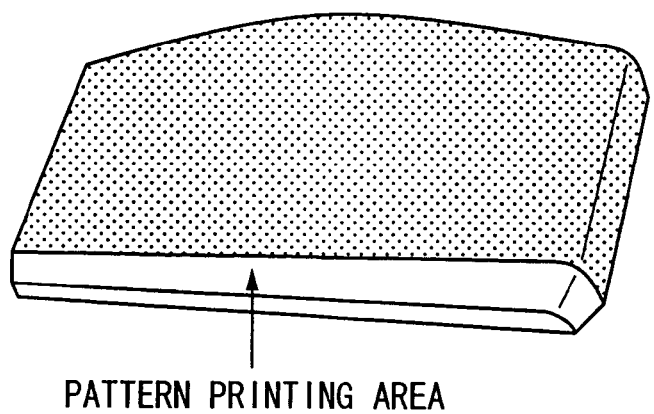
FIG. 9A is a perspective view showing an object after cutting work in accordance with the second embodiment.
Figure 9B:
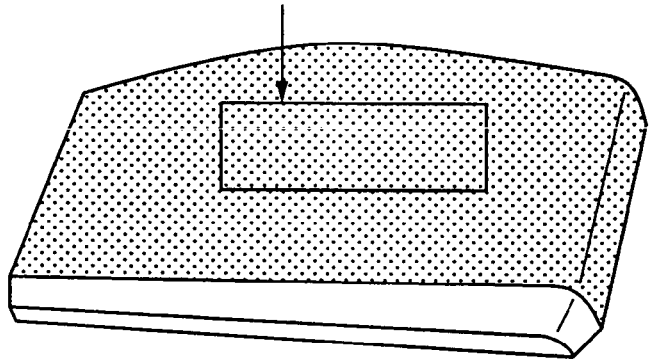
FIG. 9B is a perspective view showing the object in which a certain pattern is picked up to produce image data.

(2) An NC router (i.e., a numerically controlled router) is used to perform cutting work on prescribed parts of an object so as to realize the shape of a side arm. After the completion of the cutting work, the object is modified in shape as shown in FIG. 9A. This object has a three-dimensionally curved surface, which makes it difficult to perform pattern printing in accordance with the conventional methods such as the pattern printing by hot stamping, the vacuum adhesion of decorative sheets having patterns such as vinyl chloride sheets and olefin sheets, and the combination of polyester laminated sheets having patterns and DAP sheets.

(3) A sandpaper is used to polish the patternless area of the object due to the cutting work, wherein the object is coated with a resin, used for the pretreatment, so as to realize a coating density of 30 g/m$^2$ by use of a brush.

(4) The object is dried and is then polished using 'P240' sandpaper with respect to the resin-coated area.

(5) A digital camera is used to pick up an image of the patterned area of the polyester laminated sheet (see FIG. 9B) so as to produce image data, which are then processed to suit the form of the object.

Figure 9C:
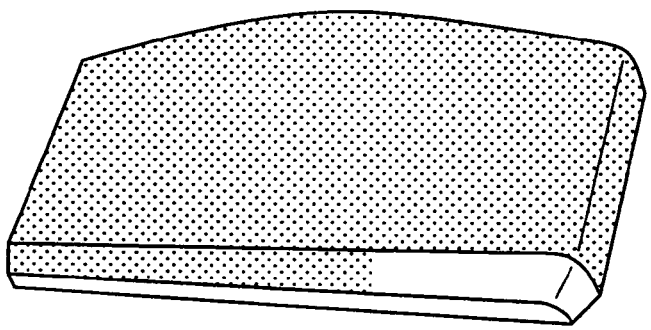
FIG. 9C is a perspective view showing the object in which the pattern is printed on a certain area of the object based on the image data.

(6) An RGB color inkjet printer is used to print the pattern based on the image data on the resin-coated area of the object (see FIG. 9C).

Figure 9D:
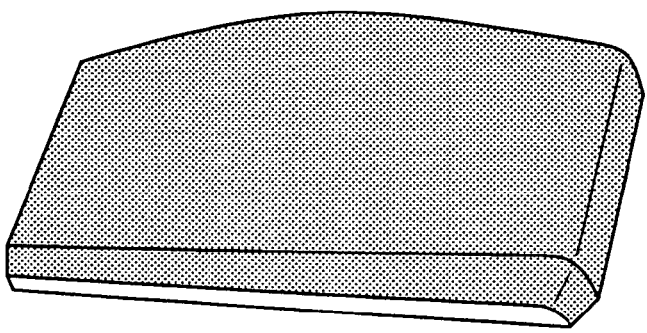
FIG. 9D is a perspective view showing the object that is finished using a polyester coat.

(7) In order to protect the pattern printed area of the object and to realize gloss, the object is subjected to polyester coat finishing so as to realize an overall film thickness of 400 μm (see FIG. 9D). Thereafter, 'P800' sandpaper is used to polish the surface of the object; then, the object is subjected to further polishing and finishing using a buff.

In the first example of the object, which corresponds to the wooden arm of an electronic musical instrument, it is possible to realize a sense of unity between the originally patterned area and the pattern printed area. In addition, the object is finished naturally and beautifully without causing a feeling of incongruity on the curved surface having grain patterns in visual sensation. Incidentally, the step (5) can be modified such that the prescribed pattern of the polyester laminated sheet is picked up to produce image data before the polyester laminated sheet is adhered to the MDF.

Next, a second example is produced in accordance with the following steps.

(1) Natural sliced sheets (i.e., American walnut sheets) whose thickness is 0.5 mm are adhered to both surfaces of MDF, thus producing a basic material.

(2) P180 sandpaper is used to polish the prescribed areas of the basic material corresponding to the American walnut sheets.

(3) Coloring treatment using urethane coloring agent is directly performed on the basic material, which is coated with urethane sealer so as to form coloring layers and is then dried for sixteen hours at room temperature.

(4) After drying, the NC router is used to process the basic material in the form of a wooden arm, thus producing an object.
(5) P180 sandpaper is used to polish the processed portion of the object.
(6) The polished portion of the member (see (5)) is coated with urethane sealer using a brush so as to realize a coating thickness of 50 g/m$^2$ and is then dried for sixteen hours.
(7) P240 sandpaper is used to polish the coated portion of the object (see (6)).
(8) Image data are produced using a scanner scanning the 'colored' American walnut sheet (see (3)), wherein they are cast into appropriate digital image data by use of the image processing software.
(9) The RGB color inkjet printer is used to print patterns, based on digital image data that are produced in step (8), on the polished area of the object (see (7)).
(10) The overall surface of the object is coated with an unsaturated polyester coat so as to realize a coating thickness of 400 µm; then, the object is dried for sixteen hours at room temperature. Thereafter, P800 sandpaper is used to polish the object, which is then subjected to further polishing and finishing using a buff.

Incidentally, it is possible to adhere laminated sheets to prescribed portions of the MDF after the cutting work using the NC router in each of the first and second examples.

Next, a third example will be described, which is for an object that was damaged by a customer (that is, damage occurred at corners of a wooden arm) and is then repaired as requested by the customer. Restoration steps are as follows:
(1) A digital camera is used to pick up an image of a non-damaged portion of the object so as to produce image data, which are then processed using the image processing software so as to produce appropriate digital image data.
(2) The damaged portion of the object is restored using putty and is made flat; then, the surface thereof is coated with a pretreatment resin (which allows ink of an RGB color inkjet printer to be fixed easily); thereafter, the object is dried at room temperature for four hours.
(3) Based on the image data produced in step (1), the RGB color inkjet printer is used to print patterns on the 'processed' portion of the object that is processed in step (2).
(4) In order to protect the pattern printed area of the object (see step (3)), an air spray gun is used to coat it with urethane sealer; then, the member is dried at room temperature for sixteen hours.
(5) The entire surface of the object including the 'coated' area (see step (4)) is polished using 'P400' sandpaper.
(6) The object is coated with a flat paint (whose 60° specular gloss degree ranges from '15' to '20') so as to realize a coating thickness of 15 µm; then, it is dried at room temperature for sixteen hours.

Thus, the aforementioned object that was damaged is repaired and restored in such a way that patterns and coloring in the repaired portion of the object may perfectly match other surrounding patterns and coloring of the object, whereby the object can be restored after having been damaged with a good finish.

According to the third example described above, a scanner or a digital camera is used to produce digital image data with respect to the prescribed portion of an object to which certain decoration is applied; then, an RGB color inkjet printer is used to print patterns on the non-pattern portion of the object based on the digital image data, wherein it is possible to realize a sense of unity in visual sensation between the originally pattern printed area of the object and the newly pattern printed area of the object.

The present embodiment allows patterns based on digital image data, which are produced with reference to the 'existing' articles and the like, to be printed on any types of objects; hence, it is unnecessary to provide a sampler or master for picking up an image to produce digital image data. That is, the present embodiment ensures that users may print any type of pattern on any part of objects in conjunction with digital image data, which can be produced using any type of electronic device such as scanners and digital cameras. Therefore, it is possible to remarkably increase the degree of freedom in designing objects without considering the limitations of printing. In addition, digital image data are processed in response to the form of an object, so that the processed digital image data are used to print patterns on the prescribed portion of the object. That is, even when the object has curved surfaces, it is possible to realize natural decorative effects in visual sensation without causing partial expansion or distortion of patterns printed on the object.

Since the present embodiment does not incur the costs for the production of a sampler or master, it is possible to produce a variety of objects having various forms subjected to pattern printing. Even when an object is partially damaged or accidentally cut off and requires repair, a digital camera is used to pick up an image from a normal portion (i.e., non-damaged portion) of the object so as to produce digital image data, which are processed and are then use to print 'repair' patterns on the damaged portion of the object, whereby it is possible to restore the object after it is damaged so as to have a good finish.

Incidentally, the present embodiment performs pattern printing based on digital image data, which can be easily processed in various pictorial elements or in color tone without modifying outlines of patterns; in other words, it is possible to easily apply desired accents to patterns.

3. Third Embodiment

Figure 10:
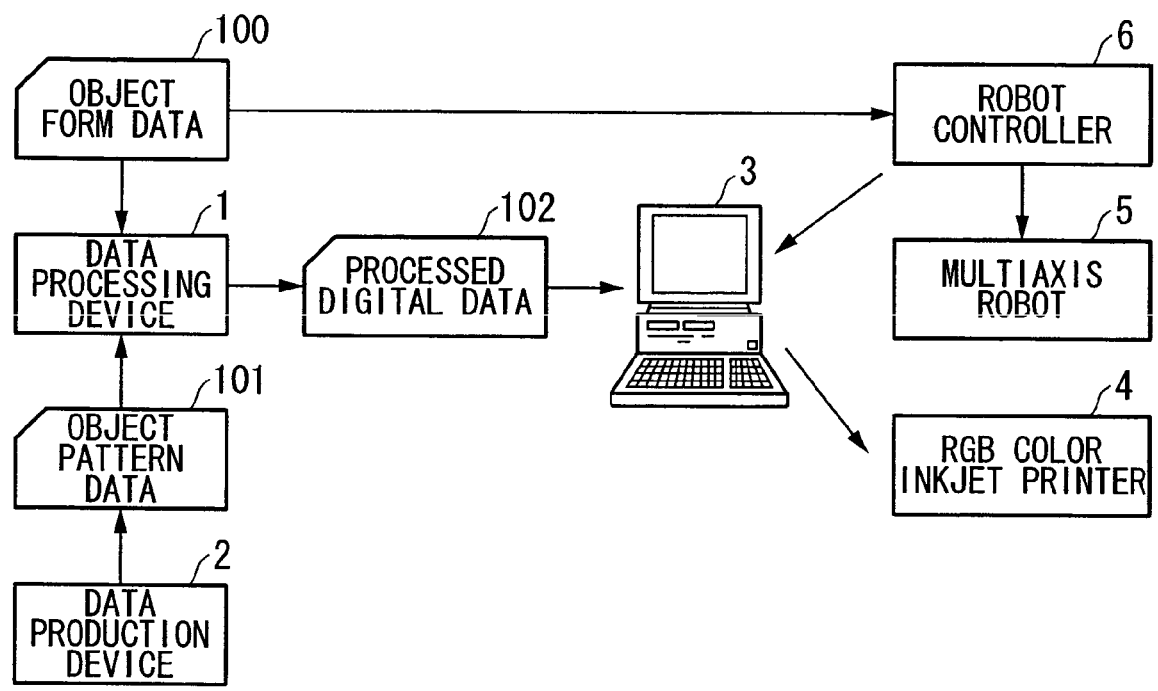
FIG. 10 is a block diagram showing the overall constitution of a printing system in accordance with a third embodiment of the invention.

FIG. 10 is a block diagram showing the overall constitution of a printing system in accordance with a third embodiment, wherein parts identical to those shown in FIG. 1 are designated by the same reference numerals; hence, the detailed description thereof will be omitted. Compared with the printing system of the first embodiment shown in FIG. 1, the printing system of the third embodiment shown in FIG. 10 is characterized by additionally including a multiaxis robot 5 (serving as a holder) for holding an object subject to printing using the RGB color inkjet printer 4, wherein the object is subjected to motion control such as rotation using a rotary mechanism and the like so that a prescribed surface of the object is positioned to meet an ink ejecting portion of the RGB color inkjet printer 4. In addition, the multiaxis robot 5 is controlled by a robot controller 6, which selects the prescribed surface of the object subject to printing.

Next, printing procedures of the third embodiment will be described in conjunction with the flowchart of FIG. 2, wherein the third embodiment differs from the first embodiment in terms of the additional provision of the multiaxis robot 5 and the robot controller 6; therefore, the following description will be given with respect to only the technical features of the third embodiment.

After the foregoing steps S200 to S202, the flow proceeds to step S203 in which the master controller 3 inputs the processed digital data 102 that are processed to suit the form of the object by the data processing device 1 in step S202. Upon receipt of a user's print instruction, the master controller 3 instructs the robot controller 6 to recognize the form of the object. In accordance with this instruction, the robot controller 6 reads parameters and data regarding the three-dimensional form of the object so as to recognize the overall form of the object. With respect to each of the surfaces of the object, the robot controller 6 compares the read data with the object form data 100.

Then, the robot controller 6 selects a certain surface of the object, the read data of which match the object form data 100, so that the robot controller 6 issues an instruction to the multiaxis robot 5 holding the object and also issues a request for transferring the processed digital data 102 regarding the selected surface of the object. In response to the instruction from the robot controller 6, the multiaxis robot 5 rotates or moves the object to direct the selected surface to meet the ink ejecting portion of the RGB color inkjet printer 4. In response to the request from the robot controller 6, the master controller 3 supplies the processed digital data 102 regarding the selected surface of the object to the RGB color inkjet printer 4. Based on the processed digital data 102, the RGB color inkjet printer 4 prints patterns on the selected surface of the object. A similar operation is repeatedly performed with respect to the other surfaces of the object, so that pattern printing is completed with respect to all the selected surfaces of the object.

As described above, the third embodiment combines the RGB color inkjet printer 4 and the multiaxis robot 5, wherein the multiaxis robot 5 is moved to direct the selected surface of the object towards the ink ejecting portion of the RGB color inkjet printer 4. This allows images or patterns represented by the digital image data, which are produced in advance, to be adequately printed on all the selected surfaces of the object. The third embodiment is superior in continuity in printing, wherein even when the object has complicated curved surfaces, it is possible to clearly print patterns on the selected surfaces of the object upon issuance of one instruction.

As this invention may be embodied in several forms without departing from the spirit or essential characteristics thereof, the aforementioned embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A printing system comprising:
   a data processing device for processing image data of a three dimensional shape based on prepared object form data representing a form of an object, said processing being one or more selected from the group consisting of rotation, expansion/reduction, aspect ratio change, inversion, color control, brightness control and contrast control; and
   a printer for ejecting ink onto a prescribed surface of the object on the basis of the processed image data processed by the data processing device.

2. A printing system according to claim 1, wherein the data processing device processes the image data based on the object form data when a normal axis lying in a normal direction of the prescribed surface of the object does not lie in parallel with a reference axis lying in an ink ejecting direction defined by the printer.

3. A printing system according to claim 1, in which the object has a first surface having a pattern and a second surface to be printed, further comprising a data production device for producing image data based on the pattern of the first surface of the object, wherein the data processing device processes the image data based on the object form data, so that the printer prints a pattern based on the processed image data on the second surface of the object.

4. A printing system according to claim 1 further comprising:
   a selector for selecting at least one surface of the object subjected to printing, wherein the data processing device processes the image data in correspondence with the selected surface of the object; and
   a holder for holding the object in such a way that the selected surface of the object is directed towards the printer, so that the printer ejects ink onto the selected surface of the object on the sis of the processed image data.

5. A printing system according to claim 4, wherein when a normal axis lying in a normal direction of the selected surface of the object does not lie in parallel with a reference axis lying in an ink ejecting direction of the printer, the data processing device processes the image data based on the object form data.

6. A printing method comprising the steps of:
   processing image data of a three dimensional shape based on prepared object form data representing a form of an object; and
   ejecting ink onto a prescribed surface of the object on the basis of the processed image data; wherein
   said processing is one or more selected from the group consisting of rotation, expansion/reduction, aspect ratio change, inversion, color control, brightness control and contrast control.

7. A printing method according to claim 6, wherein the image data are processed based on the object form data when a normal axis lying in a normal direction of the prescribed surface of the object does not lie in parallel with a reference axis lying in an ink ejecting direction in which the ink is ejected onto the prescribed surface of the object.

8. A printing method according to claim 6, in which the object has a first surface having a pattern and a second surface to be printed, further comprising the step of: producing image data based on the pattern of the first surface of the object, wherein the image data are processed based on the object form data so as to produce the processed image data.

* * * * *